(12) United States Patent
Metelius

(10) Patent No.: US 11,392,289 B2
(45) Date of Patent: Jul. 19, 2022

(54) CONTROLLING A PROCESS BY GENERATING INTENSITY VALUES

(71) Applicant: Peratech Holdco Ltd, Richmond (GB)

(72) Inventor: Joel Erik Christoffer Metelius, Stockholm (SE)

(73) Assignee: Peratech Holdco Ltd., Richmond (GB)

( * ) Notice: Subject to any disclaimer, the term of this patent is extended or adjusted under 35 U.S.C. 154(b) by 87 days.

(21) Appl. No.: 16/764,728

(22) PCT Filed: Nov. 15, 2018

(86) PCT No.: PCT/GB2018/000146
§ 371 (c)(1),
(2) Date: May 15, 2020

(87) PCT Pub. No.: WO2019/097201
PCT Pub. Date: May 23, 2019

(65) Prior Publication Data
US 2021/0373757 A1     Dec. 2, 2021

(30) Foreign Application Priority Data
Nov. 15, 2017   (GB) .................................... 1718858

(51) Int. Cl.
*G06F 3/04883*    (2022.01)
*G06F 3/041*    (2006.01)
(Continued)

(52) U.S. Cl.
CPC .......... *G06F 3/04883* (2013.01); *G06F 3/045* (2013.01); *G06F 3/0482* (2013.01); *G06F 3/0485* (2013.01); *G06F 3/04166* (2019.05)

(58) Field of Classification Search
CPC .. G06F 3/04883; G06F 3/04116; G06F 3/045; G06F 3/0482; G06F 3/0485
(Continued)

(56) References Cited

U.S. PATENT DOCUMENTS 8,314,775 B2 * 11/2012 Westerman ......... G06F 3/04883
345/173
8,799,493 B1 * 8/2014 MacInnis .............. G06F 3/0483
709/229
(Continued)

FOREIGN PATENT DOCUMENTS

WO     2009/008686 A1     1/2009

OTHER PUBLICATIONS

Geoff Walker, Part 1: Fundamentals of Projected-Capacitive Touch Technology, Jun. 1, 2014, http:/walkermobile.com/Touch_Technologies_Tutorial_Latest_Version.pdf, p. 46.

*Primary Examiner* — William D Titcomb
(74) *Attorney, Agent, or Firm* — Richard M. Goldberg

(57) ABSTRACT

Directional data is derived from a manually-interactive-device 102 configured to generate positional data and intensity data. Initial positional data is generated, along with initial intensity data from an initial contact of a finger upon the manually-interactive-device. The manually-interactive-device has a definition sufficiently high to produce a plurality of data-points in response to the application of a single finger. Directional data is produced in response to a finger rolling or tilting operation 901 by generating additional intensity data in which variations occur to intensity values at the previously identified data-point positions.

17 Claims, 16 Drawing Sheets

(51) Int. Cl.
*G06F 3/045* (2006.01)
*G06F 3/0482* (2013.01)
*G06F 3/0485* (2022.01)

(58) Field of Classification Search
USPC .......................................................... 715/863
See application file for complete search history.

(56) References Cited

U.S. PATENT DOCUMENTS

| | | | | |
|---|---|---|---|---|
| 8,902,181 | B2* | 12/2014 | Hinckley | G06F 3/04883 |
| | | | | 345/173 |
| 10,748,313 | B2* | 8/2020 | Holzer | G06T 5/005 |
| 10,750,161 | B2* | 8/2020 | Holzer | G06F 21/36 |
| 10,928,968 | B2* | 2/2021 | Garrett | G06F 1/3243 |
| 10,983,689 | B2* | 4/2021 | Chaudhri | H04L 51/22 |
| 2011/0260998 | A1 | 10/2011 | Ludwig | |
| 2015/0149956 | A1* | 5/2015 | Kempinski | G06F 3/013 |
| | | | | 715/784 |
| 2016/0077620 | A1* | 3/2016 | Choi | G06F 3/04883 |
| | | | | 345/173 |
| 2017/0199631 | A1* | 7/2017 | Coffman | H04L 12/1827 |
| 2017/0357421 | A1* | 12/2017 | Dye | G06F 3/04847 |
| 2017/0357915 | A1* | 12/2017 | Holmes | G06F 3/04883 |

\* cited by examiner

| $I_1$ | $I_2$ | $I_3$ |
|---|---|---|
| $I_4$ | $I_5$ | $I_6$ |
| $I_7$ | $I_8$ | $I_9$ |

1301 INITIAL DATA

| $T_1$ | $T_2$ | $T_3$ |
|---|---|---|
| $T_4$ | $T_5$ | $T_6$ |
| $T_7$ | $T_8$ | $T_9$ |

1302 TRANSIENT DATA

| $\Delta_1$ | $\Delta_2$ | $\Delta_3$ |
|---|---|---|
| $\Delta_4$ | $\Delta_5$ | $\Delta_6$ |
| $\Delta_7$ | $\Delta_8$ | $\Delta_9$ |

1303 DIFFERENCE VALUES T-I

MOVEMENT VECTOR

CONTROLLING A PROCESS BY GENERATING INTENSITY VALUES

CROSS REFERENCE TO RELATED APPLICATIONS

This application claims priority from United Kingdom Patent Application number GB 17 18 858.2, filed on 15 Nov. 2017, the whole contents of which are incorporated herein by reference.

BACKGROUND OF THE INVENTION

The present invention relates to a method of controlling a process and an apparatus for process control.

It is known to control processes by generating intensity values from a group of sensors arranged in a matrix. Several technologies are known for the generation of intensity values, including the use of materials that a have a variable resistance in response to receiving a manual interaction taking the form of an applied force or an applied pressure. In many applications of this type, it is often necessary to move a finger over a sensor to provide further control and it has been appreciated that, in some environments, this type of movement can create difficulties.

BRIEF SUMMARY OF THE INVENTION

According to a first aspect of the present invention, there is provided a method of deriving directional-data from a manually-interactive-device configured to generate positional-data and intensity-data, as set out in the claims.

According to a second aspect of the present invention, there is provided an apparatus, comprising a manually-interactive-device, a display-device and a processor, as set out in the claims.

According to a third aspect of the present invention, there is provided a mobile system, comprising a touch-screen, a processor and an input device for receiving geographical data, as set out in the claims.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

BRIEF DESCRIPTION OF THE SEVERAL VIEWS OF THE DRAWINGS

The invention will now be described by way of example only, with reference to the accompanying drawings, of which.

DETAILED DESCRIPTION OF THE INVENTION

FIG. 1

Figure 1:
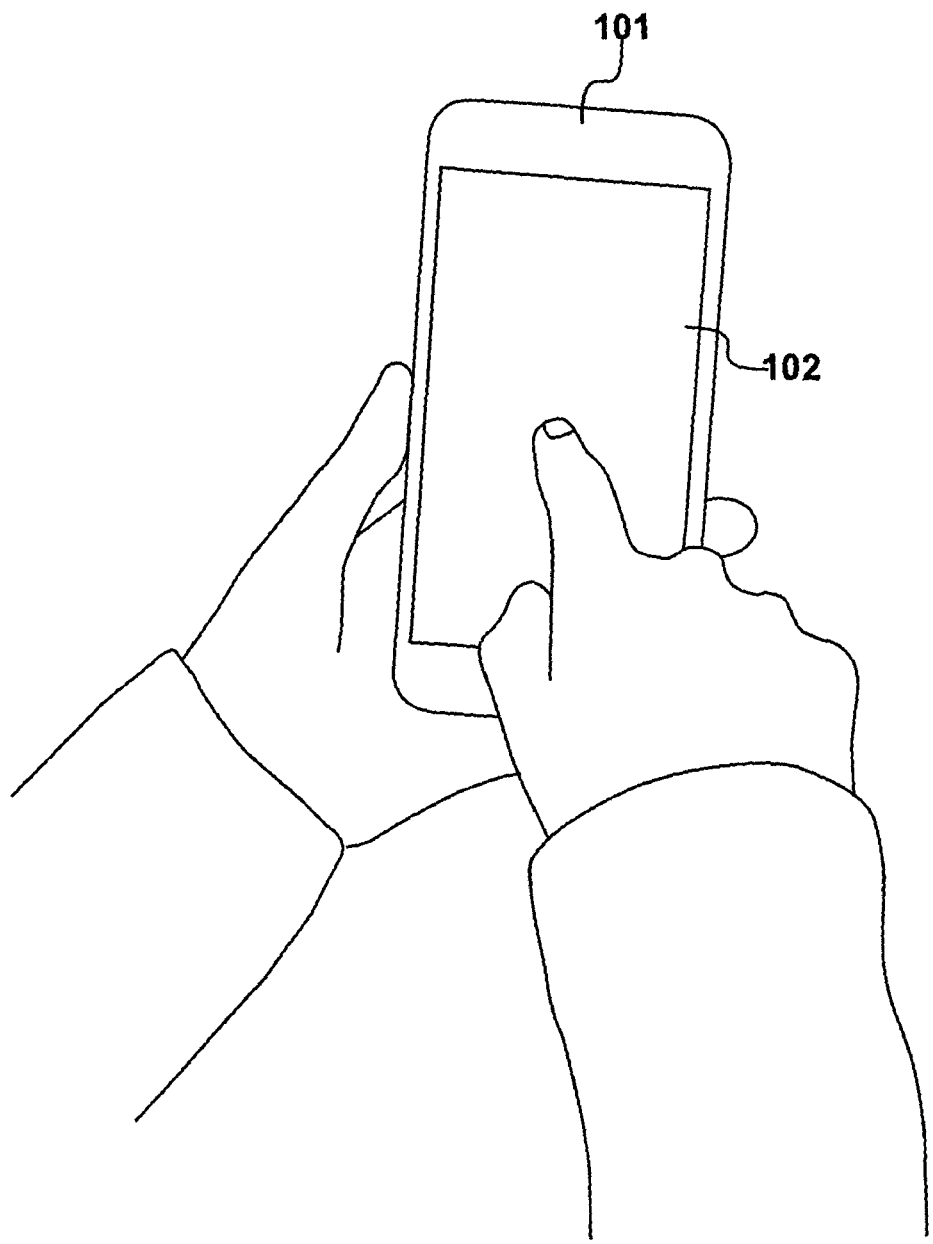
FIG. 1 shows a mobile apparatus with a manually-interactive-device.

A mobile apparatus 101 is shown in FIG. 1, that has a manually-interactive-device 102, configured to receive manual pressure applied from a user's finger or thumb. The apparatus also includes a display-device, along with a processor for receiving input data and generating output data.

The manually-interactive-device has a definition that is sufficiently high enough to produce a plurality of data-points in response to an interaction from a single finger. These data-points consist of positional-data (in the x-y plane of the device) and intensity-data representing a degree of applied pressure in a Z dimension.

In response to initial positional-data and initial intensity-data, a display-device shows a modified image indicating that a particular function, embodying an aspect of the present invention, has been selected. In this way, the processor is configured to produce directional-data, in response to the manually-interactive-device generating additional intensity-data at the position of these data-points, during a rolling or tilting of an applied finger; described in greater detail with reference to FIGS. 8 to 10.

FIG. 2

The manually-interactive-device 102 includes a plurality of sensor elements mounted on a substrate 201. Each sensor element is substantially electrically non-conductive before a mechanical interaction occurs and becomes increasingly conductive with increasing levels of interaction.

A substrate 201 is connected to a processor (a microcontroller 202) and the microcontroller 202 is configured to supply drive voltages to the sensor elements and receive sense currents from these sensor elements.

The apparatus is responsive to a manual interaction, such as the movement of a finger over an interactive surface; thus, it is possible for the detector to generate positional-data. Furthermore, at a selected position, applied pressure may vary, in response to which pressure related data is generated. Thus, the device is pressure sensitive in the Z direction.

Figure 2:
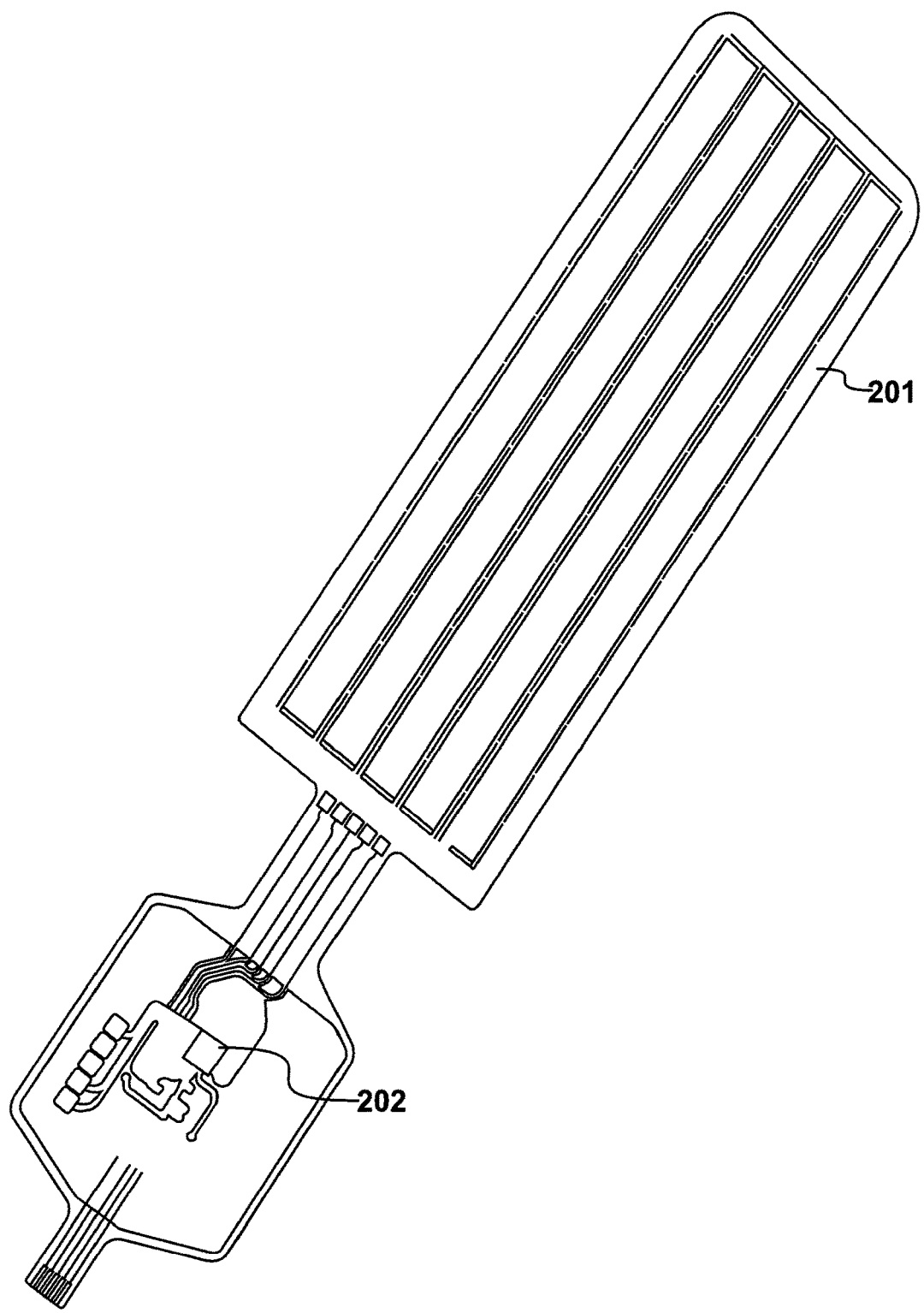
FIG. 2 details the manually-interactive-device with a plurality of sensor elements.

In the example shown in FIG. 2, the sensor elements are arranged in an array behind an interactive surface. In this particular example, the array includes fourteen sensor elements along its length and five sensor elements across its width, giving a total of individual sensor elements. However, it should be appreciated that other configurations are possible.

FIG. 3

Figure 3:
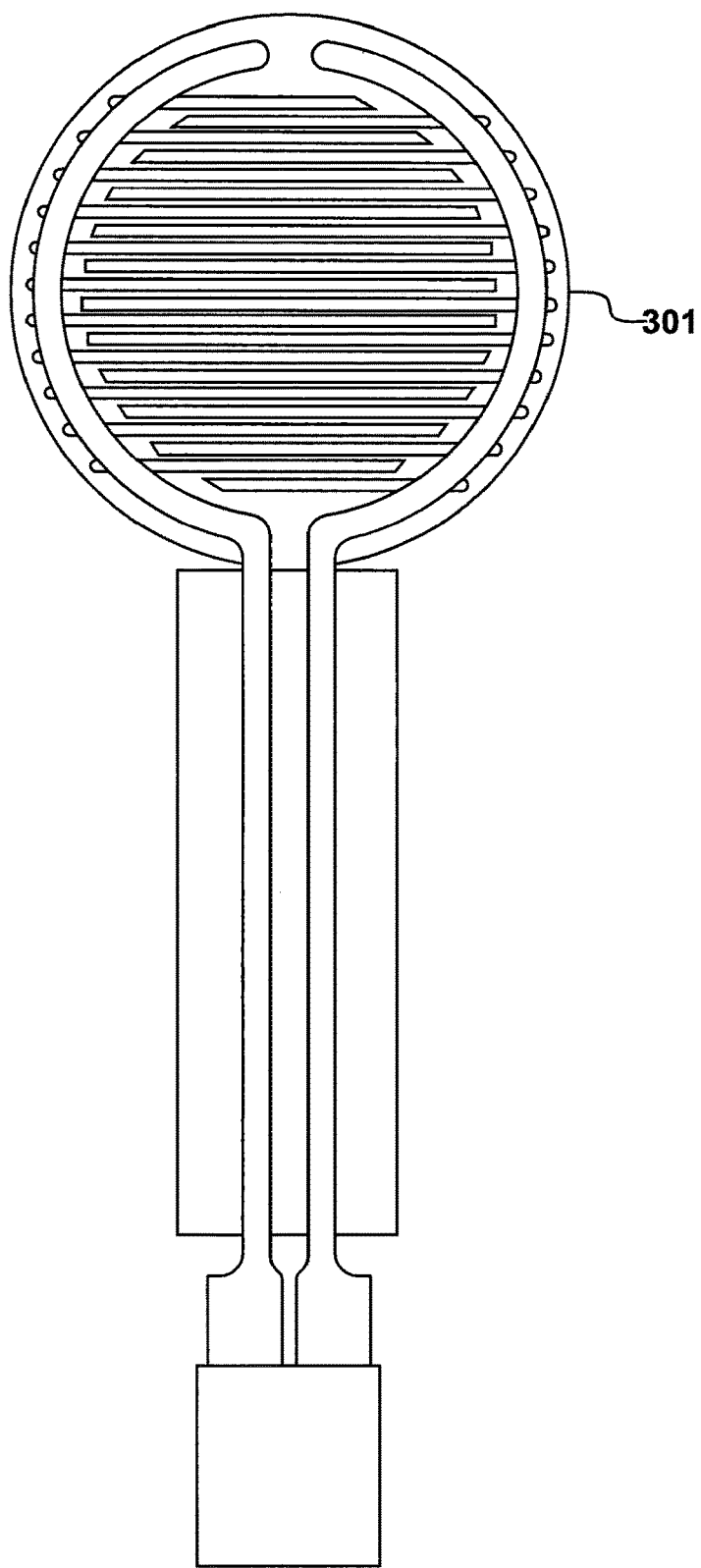
FIG. 3 shows an individual sensor element.

An individual sensor-element 301 is shown in FIG. 3 and may take the form of a sensor including material sold under the trademark QTC by the current applicant. Material of this type is also identified by the designation quantum tunneling compound.

QTC sensor elements, such as sensor element 301, are pressure sensitive membrane switches that change resistance in a predictable manner following an application of force. In the circuitry disclosed herein, the sensor may be seen as a variable resistor that can be implemented within an electronic system using a voltage divider circuit.

FIG. 4

Figure 4:
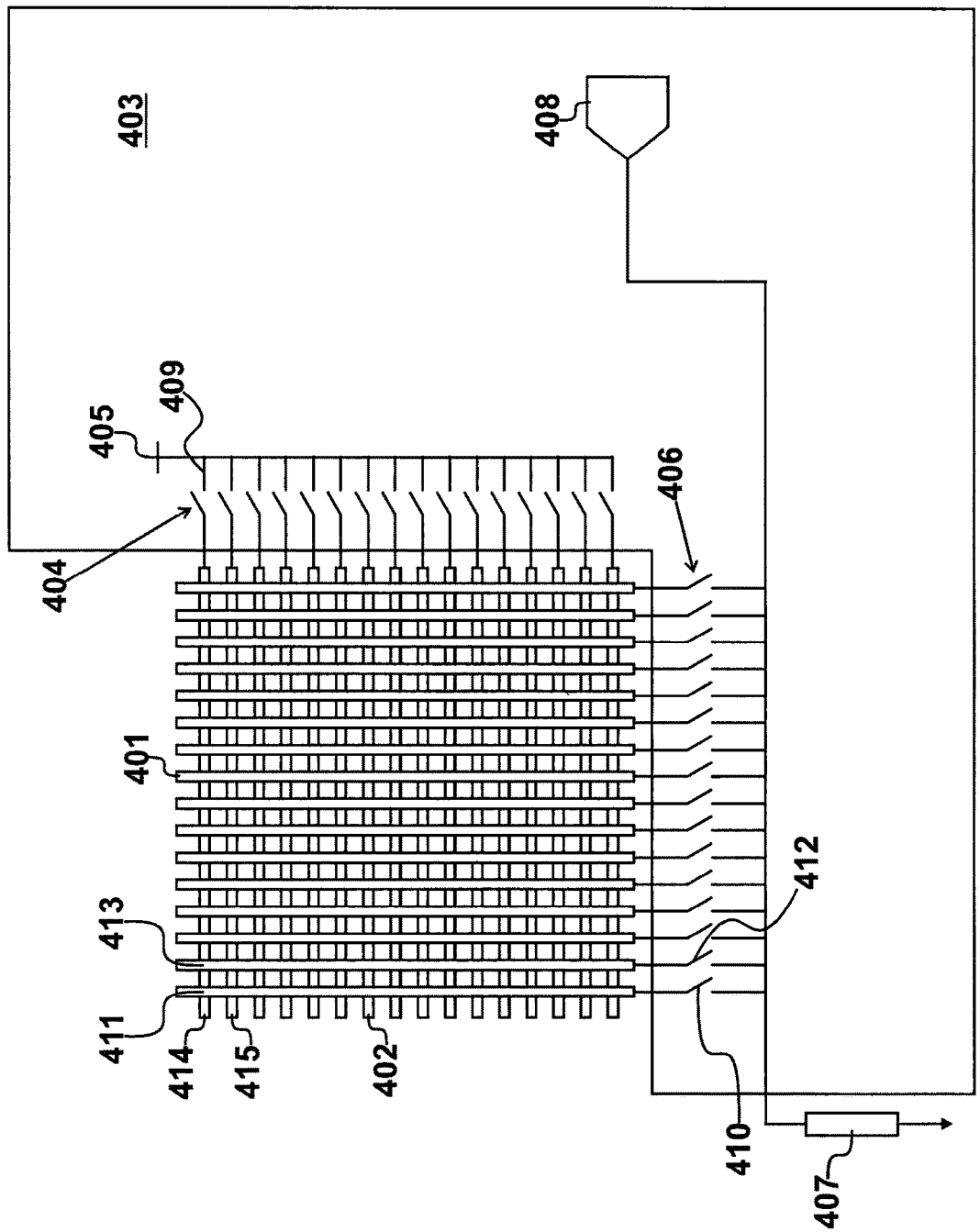
FIG. 4 illustrates a multiplexing circuit.

In order for a single microcontroller to consider input data from a substantial number of sensor elements, it is possible to configure the devices in a multiplexing circuit, as illustrated in FIG. 4. A plurality of column conductors 401 are positioned above a plurality of row conductors 402. A sensor element is provided at the intersection of each column conductor with each row conductor. Thus, at each intersection, pressure may be detected by energizing a respective sensor element.

To achieve a multiplexing operation, the microcontroller provides an electrical connection to each row conductor 402, along with an electrical connection to each column conductor 401. Instructions executed by a microcontroller 403 perform a multiplexing operation, illustrated by a plurality of switches 404. Thus, switches 404 are activated sequentially such that, at any instant, only one of the row conductors 402 is connected to a drive voltage 405. Similarly, a plurality of switches 406 ensure that only one of the column conductors 401 is connected in series with a reference resistor 407 at any instant to define a voltage divider. A tapped voltage from this voltage divider is applied to an analog to digital convertor 408 such that, at any instant, only current from one of the column conductors 401 results in the application of a measurable voltage being applied to the analog-to-digital convertor 408.

When operational, a first switch of an input multiplexer is activated; thus, it may be assumed that switch 409 is activated. While activated, each of the input multiplexer switches is activated sequentially. Thus, a first switch 410 is closed resulting in a measurement being made at detector position 411. Thereafter, switch 412 is closed, resulting in a measurement being made for detector position 413. Thus, this process continues across a first row 414.

Having sampled each position across row 414, the next row, row 415, is selected and the process is repeated. In this way, output lines 402 drive the detector array and column lines 401 sense values of the detector array. Thereafter, further instructions executed by the microcontroller 403 allow the resulting temporal signals to be converted back into a spatial representation, thereby allowing spatial interactions and movements to be detected from multiple independent locations.

FIG. 5

Figure 5:
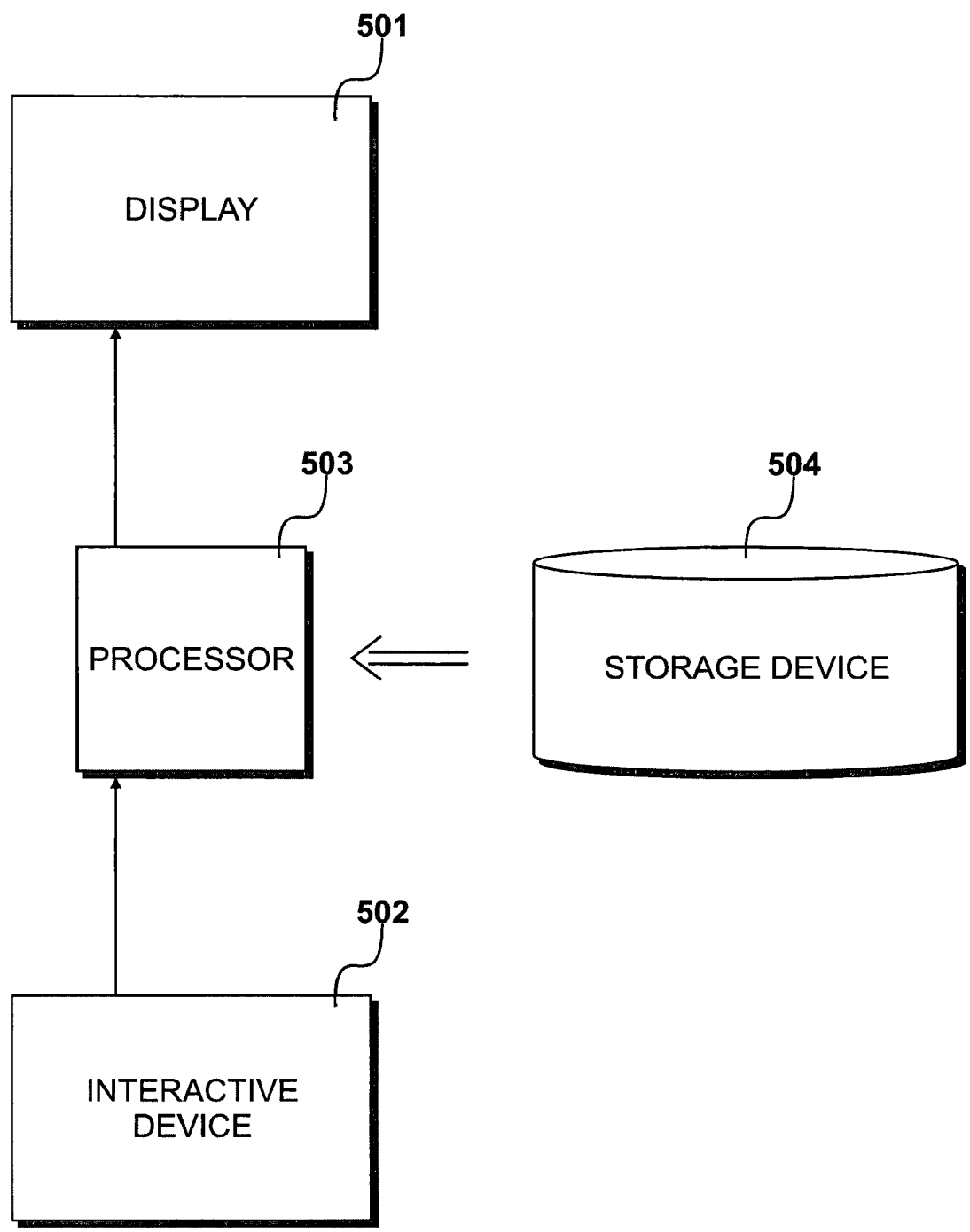
FIG. 5 shows a general overview of an apparatus for allowing a user to make manual selections.

A general overview of an apparatus for allowing a user to make a manual selection is illustrated in FIG. 5. A display device 501 shows a range of entities in a scrollable list. A manually interactive device 502 is arranged to produce an output signal that changes by an extent related to an applied level of pressure. A processor 503 is configured to scroll through the list at a rate determined by the output signal. Furthermore, the processor is configured to reduce the range of entries in the list that may actually be displayed as a scrolling operation is performed.

Data displayed on the display device 501 may also include visual or graphical data derived from a storage device 504.

FIG. 6

In an embodiment, the display-device 501 may be combined with the manually-interactive-device 502 to form a touch sensitive screen supported by a back-plane 601. Thus, provided the display-device 501 is sufficiently flexible, it is possible for a front-panel 602 to receive manual interactions, as illustrated by arrow 603, while presenting visual images to a user, as illustrated by arrow 604.

FIG. 7

Figure 6:
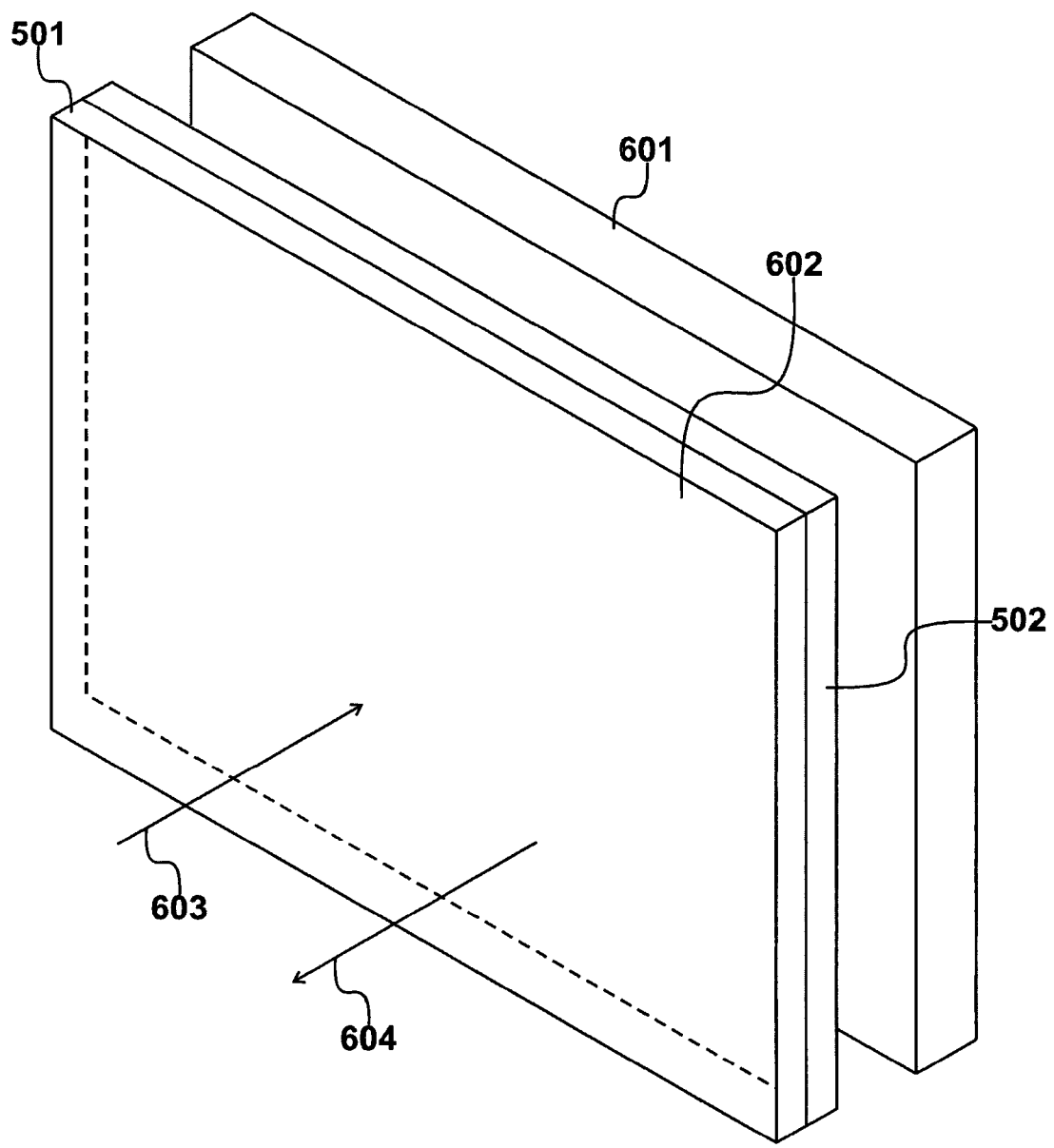
FIG. 6 shows a manually-interactive-device combined with a display-device.

An alternative application for satellite navigation is to provide a dedicated satellite navigation system 701 within a vehicle. The satellite navigation system includes a touch-screen 702 having a construction substantially similar to that shown in FIG. 6. Data storage 504 may be provided locally.

Figure 7:
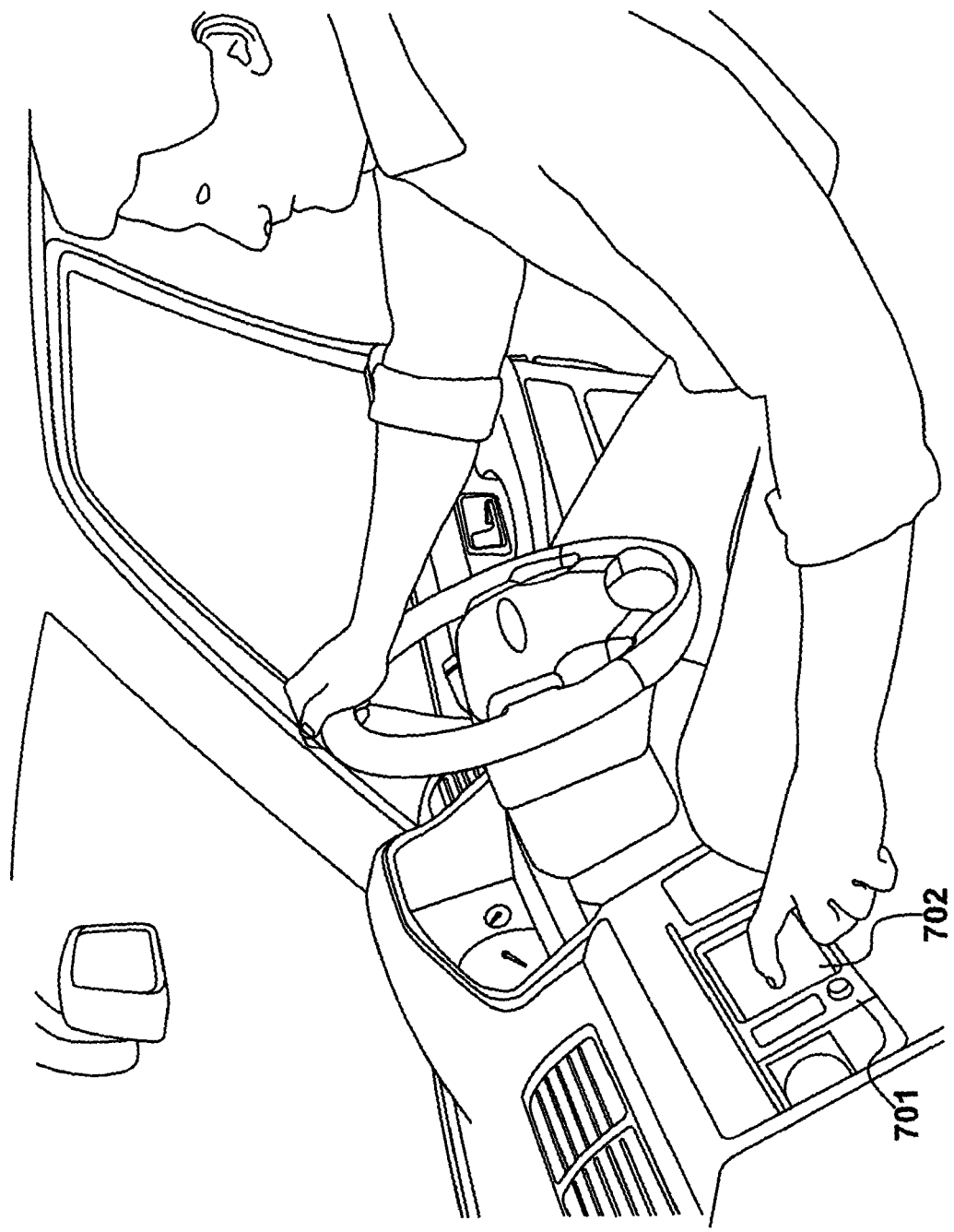
FIG. 7 illustrates deployment of an embodiment within a satellite navigation system.

The configuration of FIG. 7 provides an example of a mobile system comprising a touch-screen, a processor and an input device for receiving geographical data. The touch-screen generates initial positional-data and initial intensity-data from an initial contact of a finger upon the manually-interactive-device. The manually-interactive-device has a definition sufficiently high to produce a plurality of data-points in response to the application of a single finger. The touch-screen shows a cursor overlaying a geographical image derived from the geographical data. The processor produces directional-data in response to a finger rolling or tilting operation, by generating additional intensity-data in which variations occur to intensity values at a plurality of data-points. This allows the geographical data to be scrolled in a direction determined by the directional-data, without a user being required to actually move the position of their finger.

FIG. 8

The manually-interactive-device 502 has a relatively high resolution when measuring applied force or pressure in the Z dimension. It is therefore possible to detect that a finger has rolled or tilted in a particular direction.

On devices with a high spatial definition, a slight finger movement may still result in different sensor positions being activated, such that small translations may be detected even when these translations are primarily due to a roll or tilt. However, in accordance with the present invention, it is not necessary for new spatial locations to be identified. The spatial definition is such that several locations are activated upon a single finger press. A rolling or rocking of the finger does not result in new spatial positions being identified. However, across a matrix of activated sensors, relative differences will occur upon the activated locations, in response to a rocking or rolling of a finger or thumb.

Figure 8:
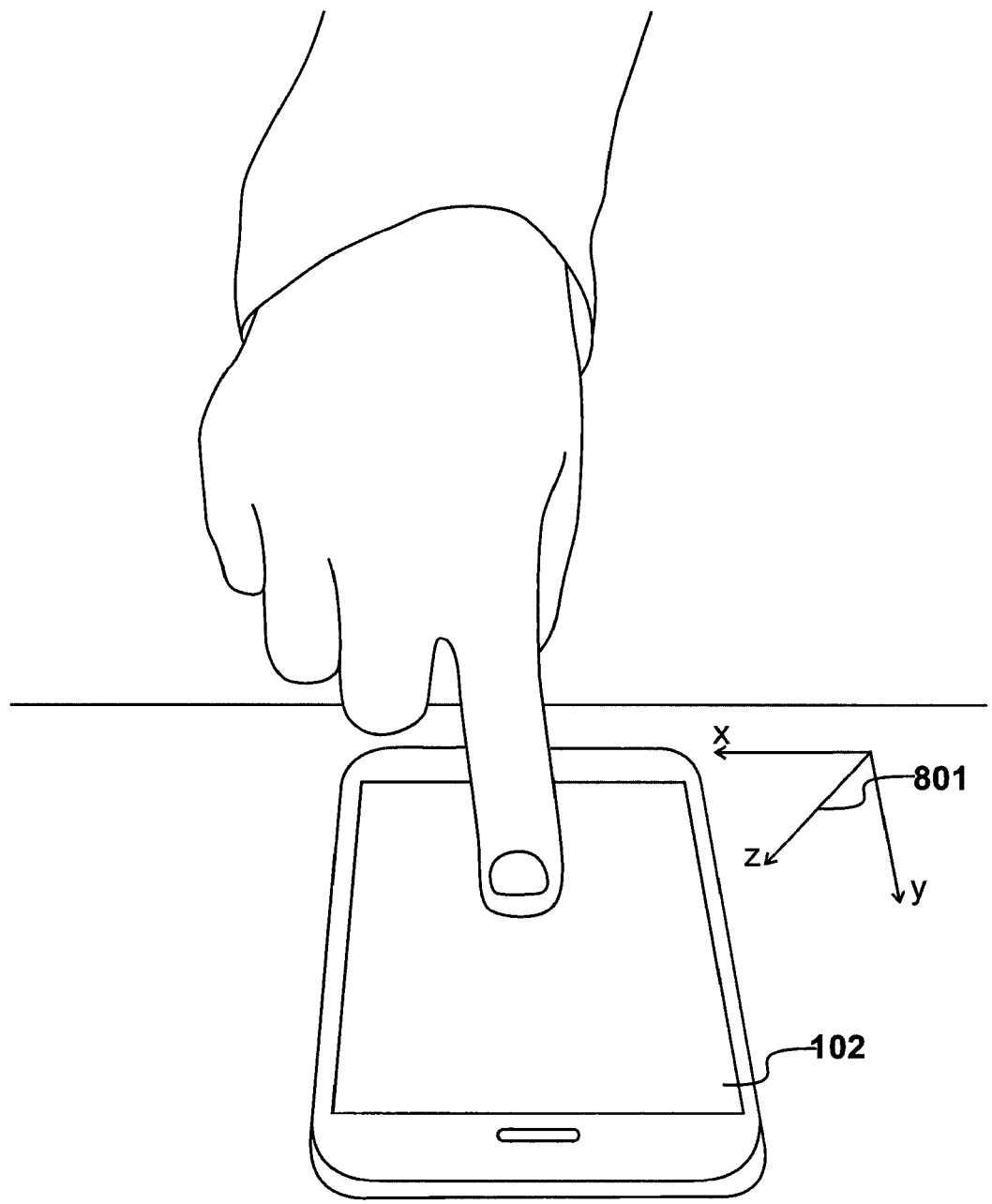
FIG. 8 shows a first manual interaction.

As illustrated in FIG. 8, this process may be initiated by an initial manual interaction involving a relatively hard finger press, in the direction of arrow 801, orthogonal to the x-y plane of the screen 102.

FIG. 9

The invention creates the possibility of providing a virtual joystick such that having positioned a finger and applied pressure, as described with reference to FIG. 8, a finger may be tilted in the direction of arrow 901. The invention then seeks to derive functional information based on the direction in which the finger has tilted. This may create a movement and the speed of this movement may be determined by the extent to which the device has been pushed.

FIG. 10

Figure 9:
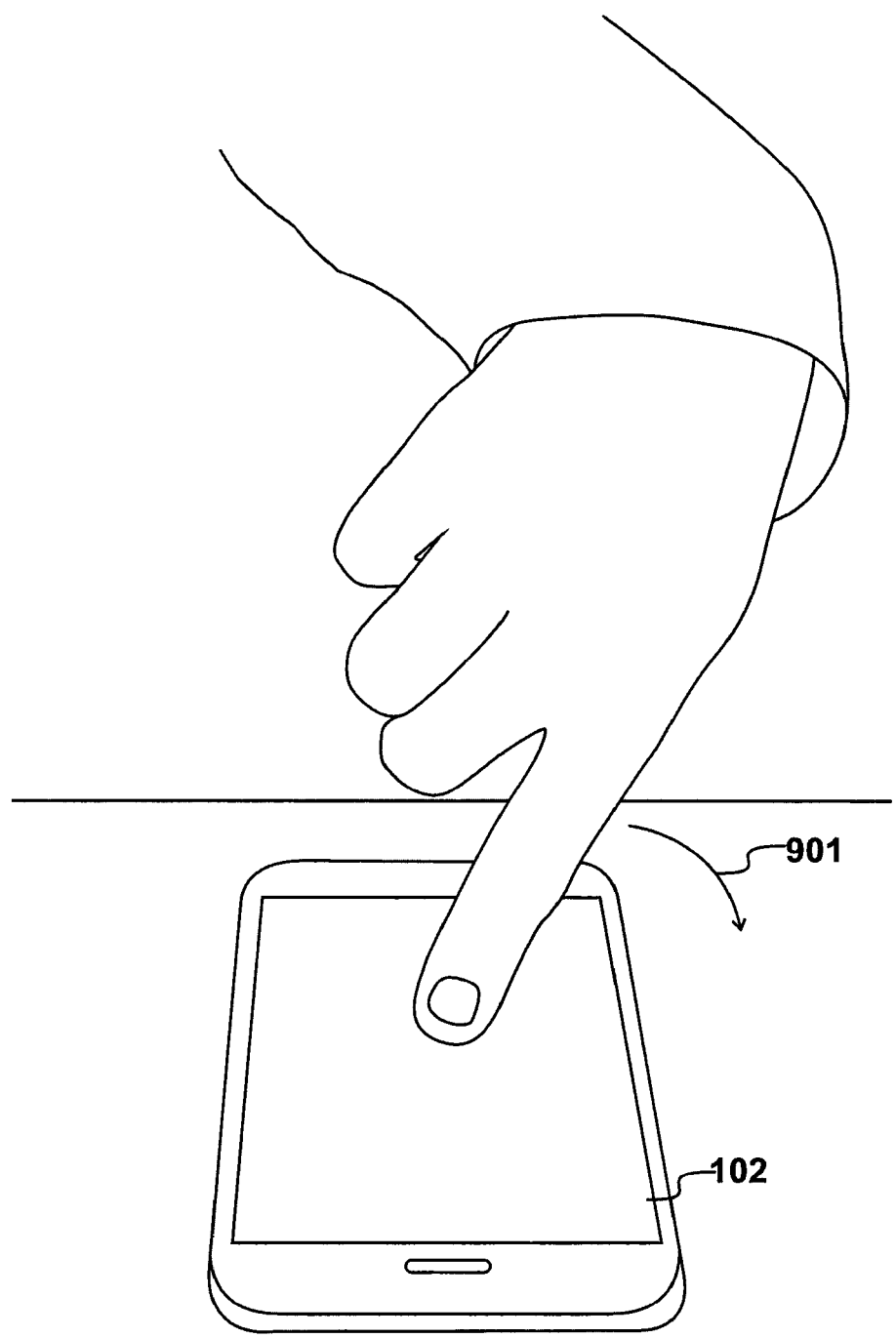
FIG. 9 shows a second manual interaction.
Figure 10:
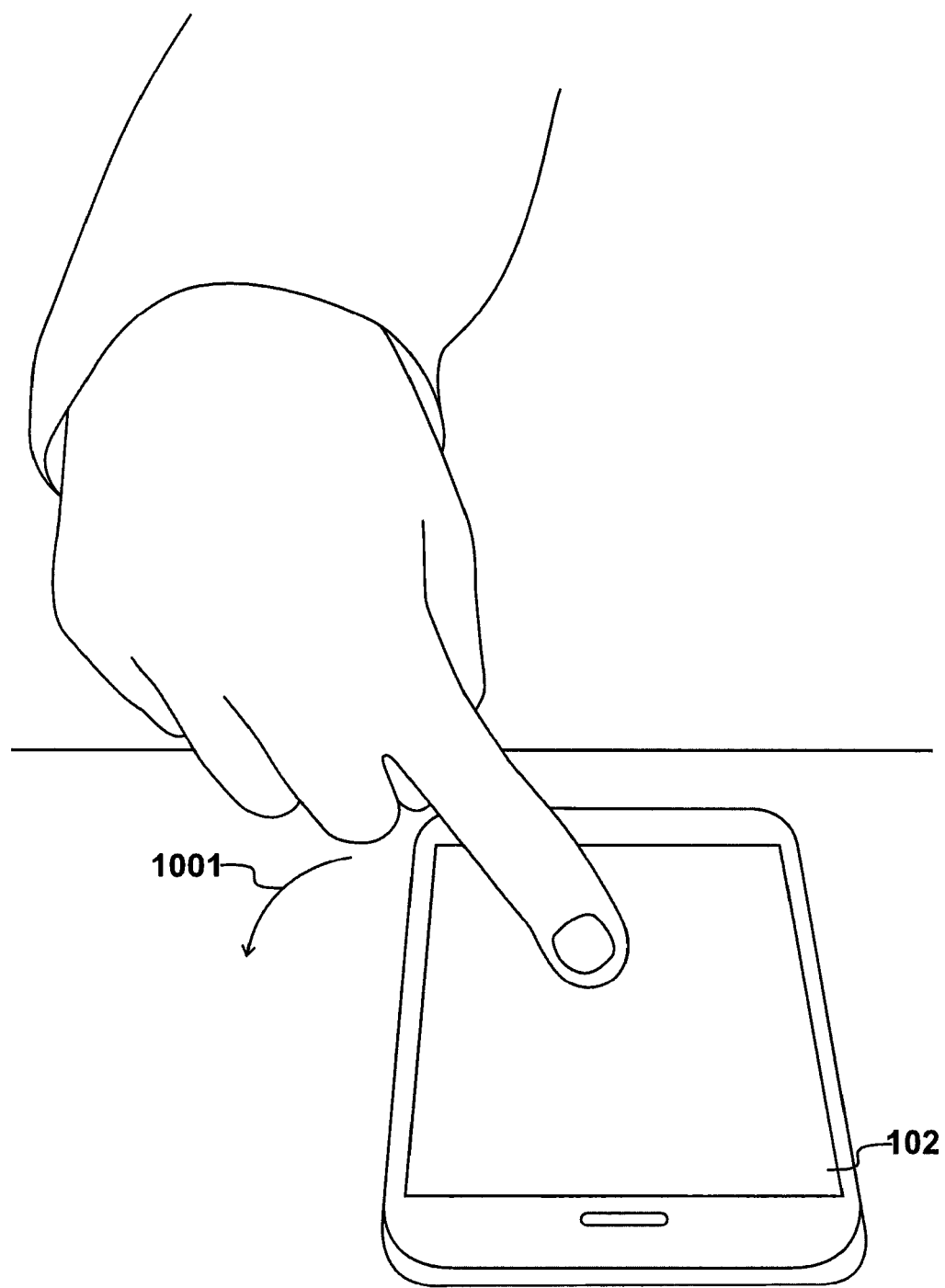
FIG. 10 shows a third manual interaction.

As illustrated in FIG. 10, rolling and tilting may occur in many directions, with an alternative direction being indicated by arrow 1001. Thus, the invention allows a form of interaction to take place that can then be used to control different events. The tilt of a user's finger, as described with reference to FIG. 9 and FIG. 10, provides a virtual joystick that can be used to provide navigation.

FIG. 11

The present invention provides a method of deriving directional-data from a manually-interactive-device configured to generate positional-data and intensity-data. Initial positional-data and initial intensity-data are generated from an initial contact of a finger upon the manually-interactive-device, as described with reference to FIG. 8. The manually-interactive-device has a definition that is sufficiently high to produce a plurality of data-points in response to the application of a single finger. The method then produces directional-data in response to a finger rolling or tilting operation (described with reference to FIG. 9 and FIG. 10) by generating additional intensity-data, in which variations occur to intensity values at the plurality of data-points previously identified.

Figure 11:
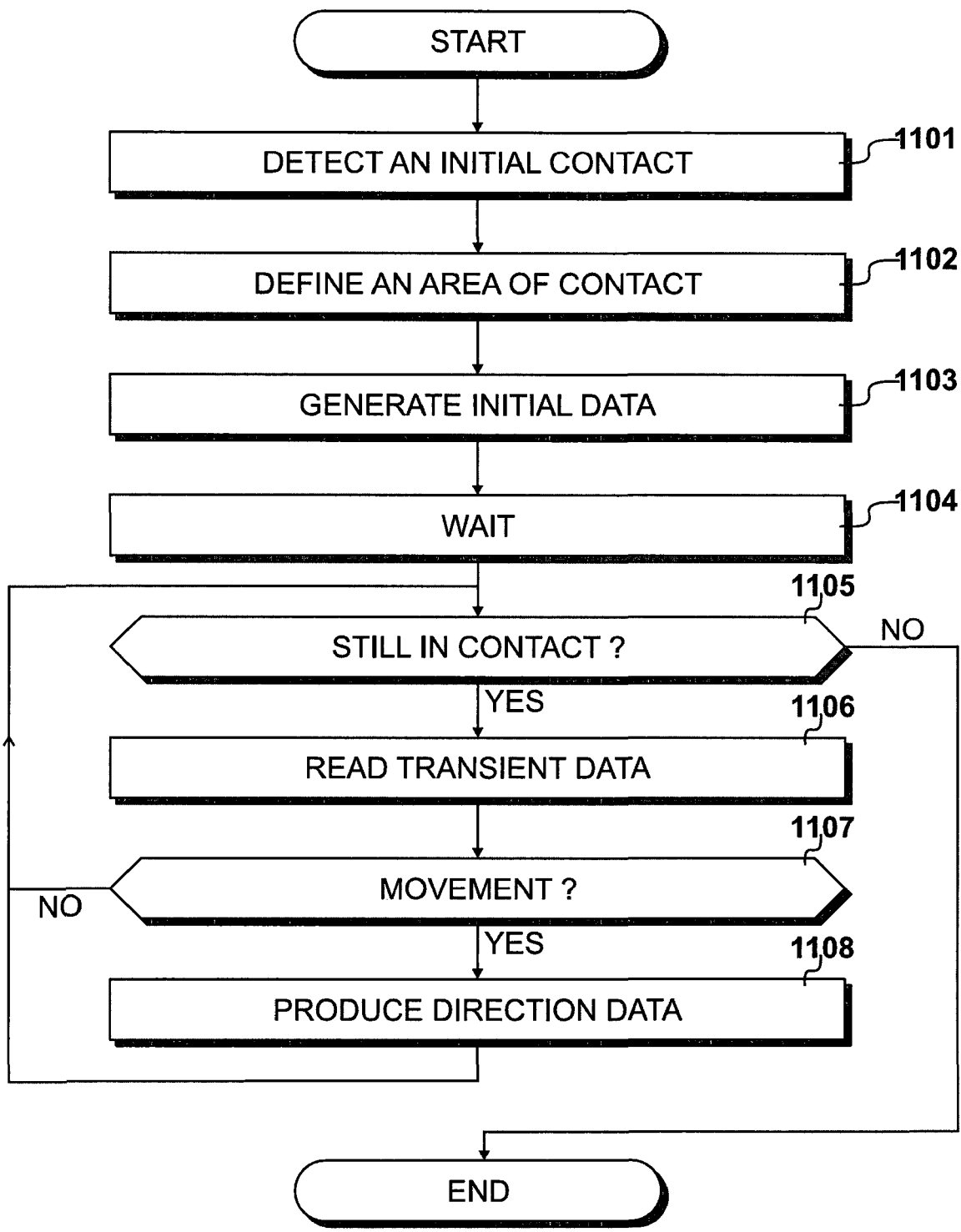
FIG. 11 illustrates procedures performed by a processor in an embodiment of the invention.

Procedures performed by processor 503 are illustrated in FIG. 11. At step 1101 an initial contact is detected that, as previously described, may represent an application of pressure that exceeds a predetermined threshold. Thus, many established operations could be performed upon the mobile device using what may be identified as a normal level of pressure. The present invention is then invoked when a higher pressure is applied, resulting in a change to the graphical display.

At step 1102 an area of contact is defined, such that subsequent processing performed by the processor 503 may concentrate on the area of interest. A matrix of intensity values may be defined and the position of this matrix within the overall screen may be defined by offset values, as described with reference to FIG. 12.

At step 1103 initial data is generated, representing intensity values for the data defined at step 1102.

In an embodiment, the clock speed of the processor is relatively high compared to the rate at which manual interactions occur. Consequently, at step 1104 the process enters a wait state, which, in a multi-threaded environment, allows the processor the service alternative applications.

At step 1105 a question is asked as to whether the user's finger is still in contact which, if answered in the negative, results in the procedure terminating. Alternatively, if the question asked at step 1105 is answered in the affirmative, transient data is read at step 1106. Thus, the previously identified data-points are sampled again in the Z dimension in order to produce transient data.

In this embodiment, transient data is created many times as movement occurs, such as moving from the position shown in FIG. 9 to the position shown in FIG. 10. This transient data is always compared back to the initial contact data, on the basis that the actual position of the user's finger has not moved. If a movement does occur, this will generally result in the degree of applied pressure reducing, such that the question asked at step 1105 will be answered in the negative.

At step 1107 a question is asked as to whether movement has occurred and if answered in the negative, control returns to step 1105, allowing the process to repeat such that new transient data is read after an appropriate waiting interval.

If the question asked at step 1107 is answered in the affirmative, to the effect that movement has occurred, directional data is produced at step 1108. Therefore, control is again returned to step 1105 and the process repeats until the question asked in step 1105 is answered in the negative.

FIG. 12

Figure 12:
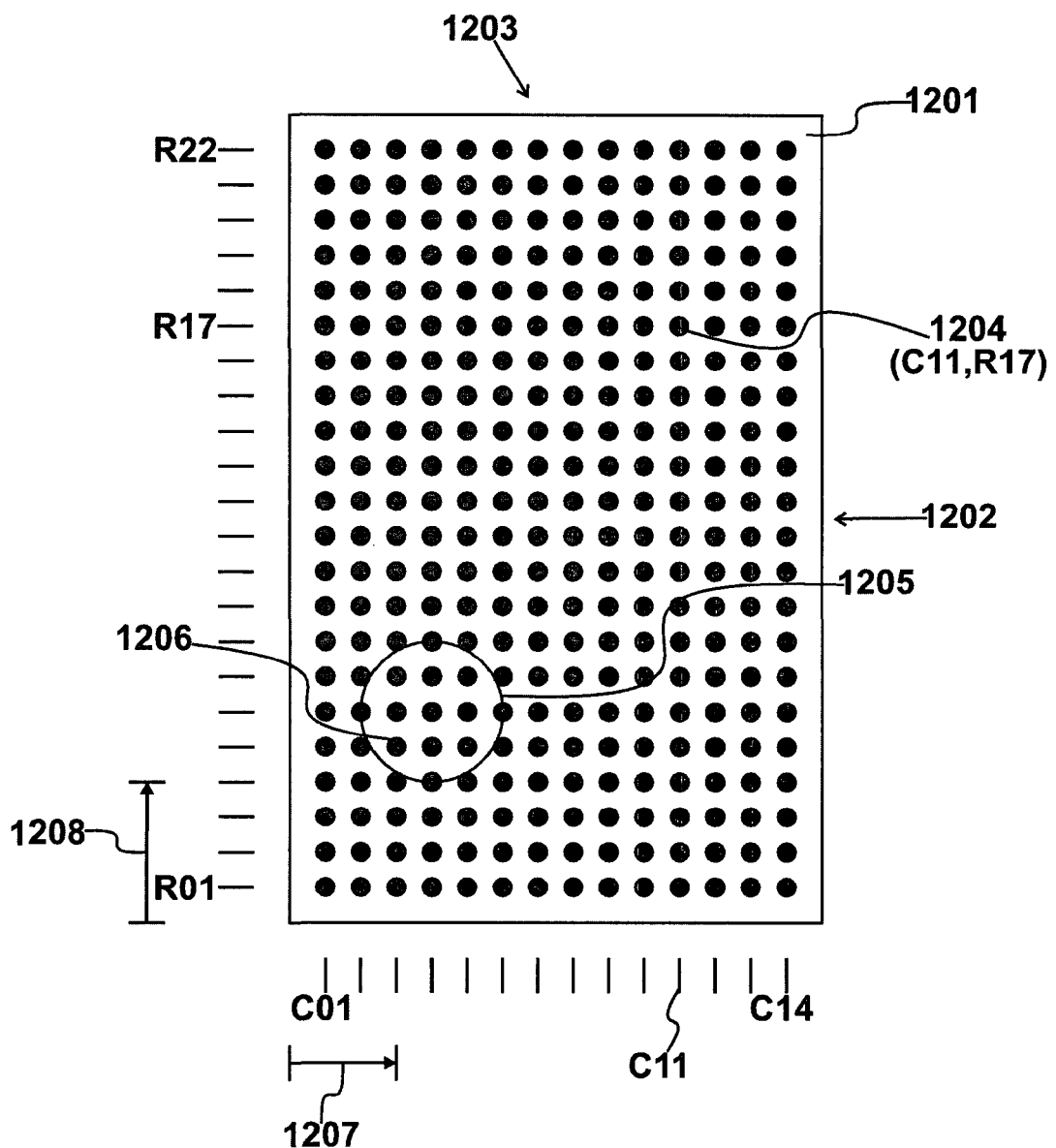
FIG. 12 illustrates a sensor array.

In a preferred embodiment, a sensor array may have thirty columns and seventy rows. For the purposes of this illustration, a lower definition sensor array 1201 is shown in FIG. 12, having twenty-two rows 1202 and fourteen columns 1203. In this embodiment, sensor positions are measured from an origin at a bottom left corner. Thus, each sensor location may be identified in the x-y plane by an x-coordinate ranging from C01 to C14 and a y-coordinate ranging from R01 to R22. Thus, sensor 1204 has a position that may be identified by coordinates C11, R17.

For the purposes of this illustration, an initial contact has been detected at location 1205. Pressure is maintained and initial data is generated at step 1103.

Figure 13:
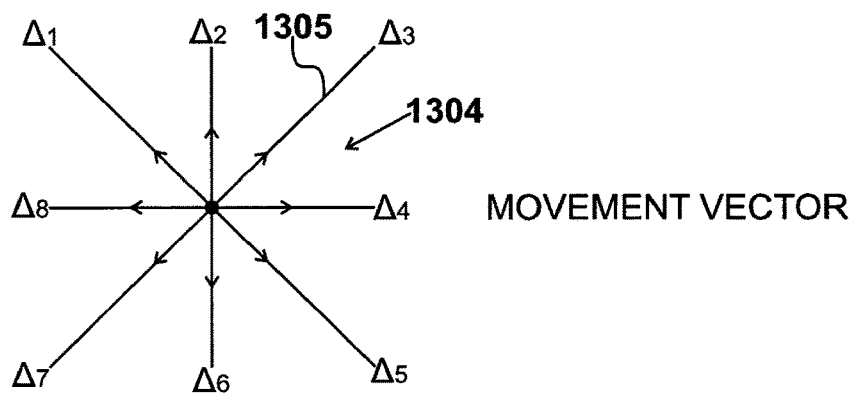
FIG. 13 illustrates an assessment of movement.

In this embodiment, the initial data covers nine sensor positions in a three-by-three (3×3) matrix. The data-points are identified by their location and intensity values are recorded as described with reference to FIG. 13.

In this example, the position of the area is identified by identifying the sensor 1206 with the lowest coordinate values. This allows the area of contact to be defined by a column positional offset, indicated by arrow 1207 and a row positional offset indicated by arrow 1208. Thus, these offsets may be defined as a vector having a value (C03, R04).

FIG. 13

In an embodiment, the initial data generated at step 1103, from the area of contact defined at step 1102, is written to an initial array 1301. In the initial array 301, the pressure values are recorded as I1 to I9 as indicated.

When the transient data is read at step 1106, pressure values are written to a transient array 1302, consisting of values to T1 to T9.

In an embodiment, movement is detected, as required at step 1107, by subtracting the transient data values in array 1302 from the initial data values in array 1301 to populate a difference array 1303. Thus, the difference array is populated by values delta 1 to delta 9. If the modulus of any of these values exceeds a predetermined threshold, it may be assumed that a rolling or tiling movement has occurred and the question asked at step 1107 will be answered in the affirmative.

In an embodiment, in order to produce directional data, the modulus of the difference values delta 1 to delta 9 is compared, such that the highest value may be selected. This results in the identification of a movement vector as indicated at 1304. Thus, if it is found that the modulus of delta 3 has the highest value, movement vector 1305 is selected.

In an alternative embodiment, all of the difference values delta 1 to delta 9 are considered. The movement vectors 1304 are combined, that is resolved, to produce a new vector that can be used for achieving a movement. Thus, in the alternative embodiment, an averaging of vectors is performed as an alternative to making a selection of the largest.

FIG. 14

Figure 14:
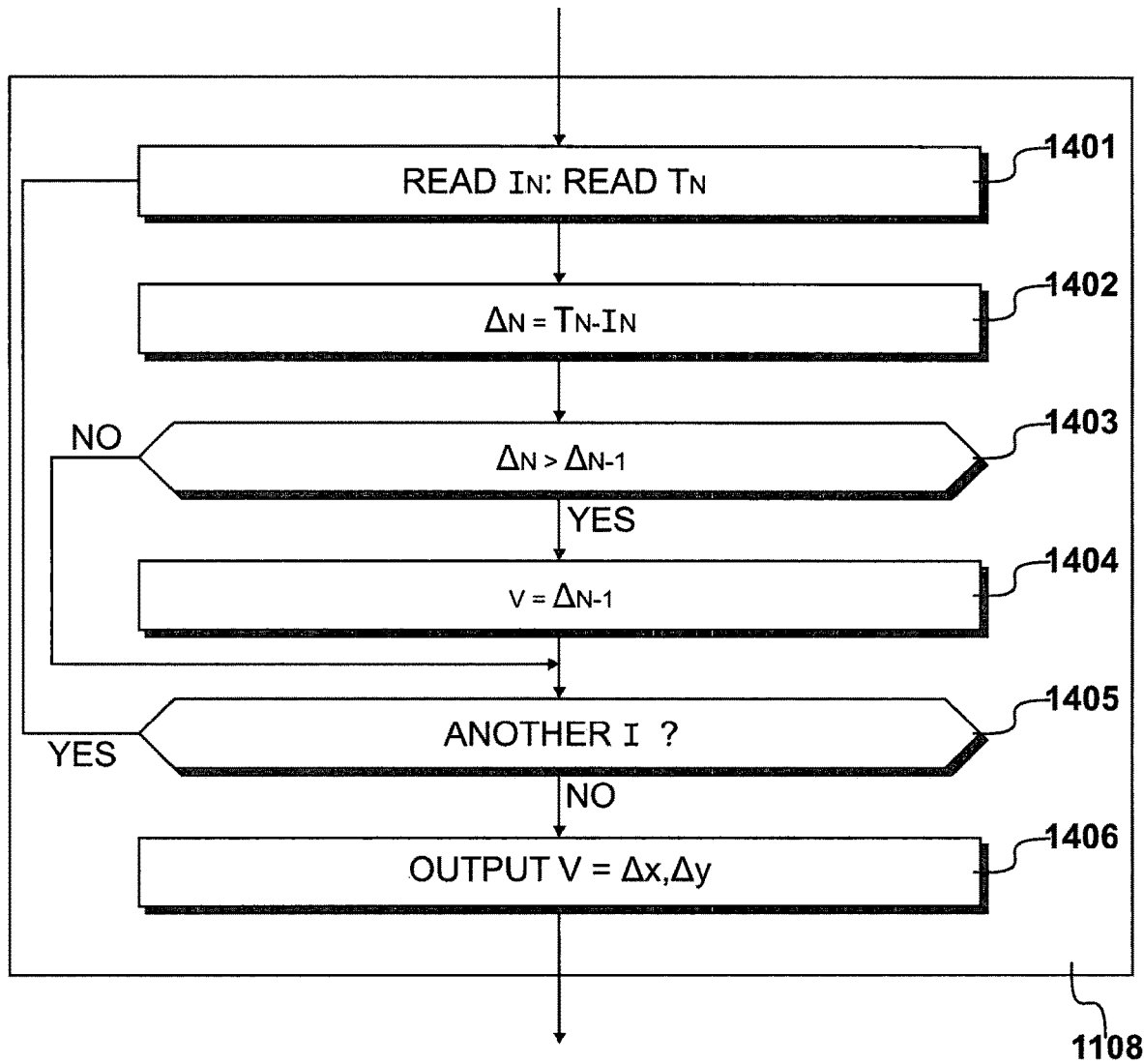
FIG. 14 illustrates the calculation of directional data.

Procedures 1108 for producing directional data are illustrated in FIG. 14. At step 1401 a value from the initial array 1301 and a value from the transient array 1302 are read.

At step 1402, a difference value for the difference array 1303 is calculated by subtracting the initial data from the transient data.

At step 1403 a question is asked as to whether the new difference value is greater than a previously recorded difference value. If this question is answered in the negative, the previous value is retained and a question is asked at step 1405 as to whether another entry exists.

If the question asked at step 1403 is answered in the affirmative, to the effect that the new value is larger than the previously recorded value, the new value replaces the old value and again the question as to whether another data-point is to be considered is asked at step 1405.

Eventually, the question asked at step 1405 will be answered in the negative, such that the highest difference value will have been identified. Using the mapping 1304 identified in FIG. 13, a particular vector is selected as an output at step 1406.

FIG. 15

Consequently, the process shown in FIG. 11 has produced a movement vector 1305 as a result of a finger being rolled to the position shown in FIG. 10. In an embodiment, a hard finger press, as described with reference to FIG. 8, results in the display of a dial-like graphical entity 1501. This may take the form of a menu that, in this example, indices a total of eight menu entities 1502 to 1509. Based on the identification of a movement vector, a particular entity within the graphical entity 1501 may be selected. Thus, upon producing vector 1305, entity 1503 may be selected.

Alternatively, it may be possible for the graphical entity 1501 to rotate by a degree that is dependent upon the tilt of a user's finger. Thus, instead of directly selecting entity 1503, the whole ring may rotate, resulting in the entity 1503 moving to the position previously occupied by entity 1502.

In an embodiment, the same menu is displayed without reference to the position at which the touch actually occurs. Alternatively, different initial touch locations could bring up different menus, possibly by making reference to offset vectors 1207 and 1208. Thus, one area could be identified for a menu relating to contacts and another area could be identified for a menu relating to applications etc.

In an embodiment, a hard press applied anywhere could result in a contact menu being displayed. In this way, it is not necessary to distinguish between a long press and a short press and subsequent selection can be made without a user being required to actually translate their finger over the screen; it is only necessary to provide tilting or rolling movement. In this respect, it is only necessary for a user to perform micro movements with their finger to provide navigation along eight axes.

FIG. 16

Figure 16:
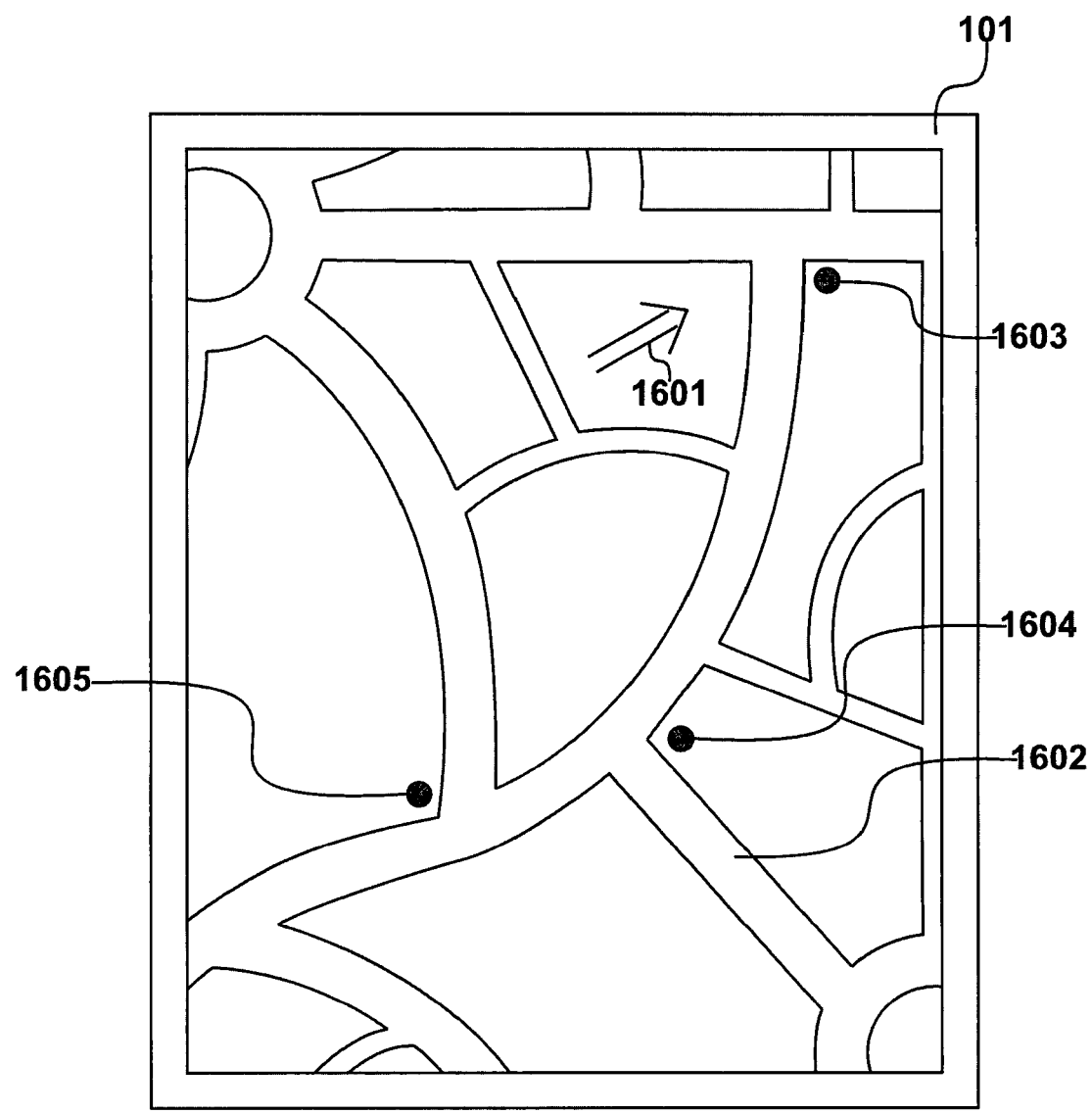
FIG. 16 illustrates an alternative graphical display.

An alternative embodiment is illustrated in FIG. 16. The application of high pressure, as described with reference to FIG. 8, results in the generation of a graphical display that includes a cursor 1601. This cursor may be presented over map features. Thus, for the purposes of this illustration, map features are shown in FIG. 16 including roads 1602 and specific destinations 1603, 1604 and 1605. Rolling or tilting, resulting in the generation of a movement vector, may cause the cursor 1601 to move within the region of the map, allowing specific destinations, such as destination 1603, to be selected. Alternatively, a viewer may be viewing a small portion of a much larger map and the generation of a movement vector may allow the map to move with the cursor 1601 remaining in position. Furthermore, pushing harder could cause the speed of movement to increase or it could perform a zooming operation.

Figure 15:
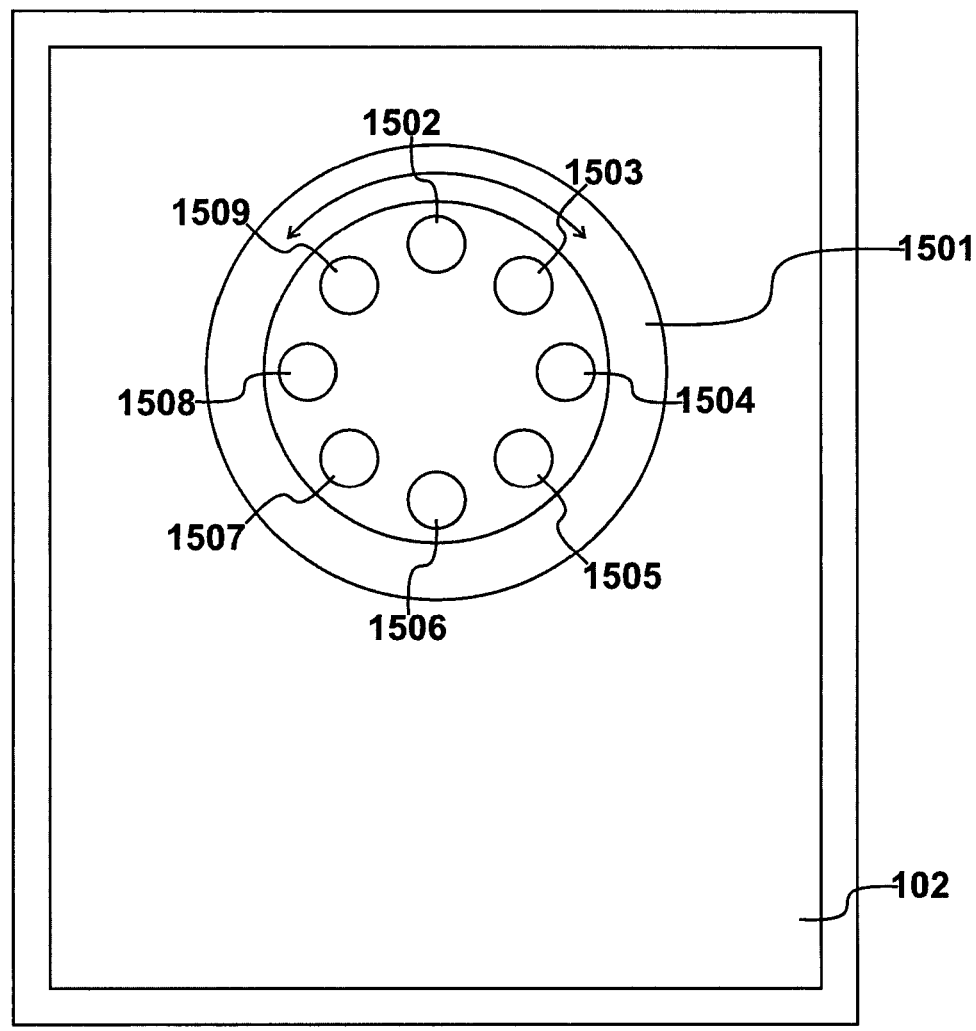
FIG. 15 illustrates a displayed graphical entity.

In an alternative embodiment, it is possible for a graphical image similar to that illustrated in FIG. 15 to be overlaid upon a map of the type illustrated In FIG. 16. The menu entities could identify specific locations in the vicinity; such as restaurants for example. Tilting would then allow a specific one of these restaurants to be selected, causing additional information to be displayed with minimal manual interaction.

Aspects of the invention have been disclosed with reference to a mobile device, such as a mobile telephone but it should be appreciated that other mobile devices may be deployed, such as a tablet or a watch. Thus, the invention enhances the capabilities of a watch that includes a touchscreen, by only requiring a single press at a static location. After pushing, a plurality of selected items may appear on the watch, whereafter a specific selection may be made by tilting, without being required to actually move.

The invention claimed is:

1. A method of deriving directional data from a manually-interactive-device configured to generate positional-data and intensity-data, comprising the steps of:
    generating initial positional-data and initial intensity-data from an initial contact of a finger upon said manually-interactive-device, wherein said manually-interactive-device has a resolution sufficiently high to produce a plurality of data-points in response to the application of a single finger; and
    producing directional-data in response to a finger rolling or tilting operation, by generating additional intensity-data in which variations occur to intensity values at said plurality of data points, and comparing the differences between said initial positional-data and initial intensity-data and said additional intensity-data at said plurality of data points; wherein
    said generating step also includes the steps of:
        processing said initial intensity-data to distinguish between a first-intensity and a second-intensity, wherein said second-intensity is higher than said first intensity; and
        presenting a menu of selectable items on a display screen, only performing said presenting step upon detecting said second-intensity; and
    said producing step includes a step of selecting one of said items, said step of selecting being made only in response to said finger rolling or tilting operation.

2. The method of claim 1, wherein said step of selecting one of said items includes a step of rotating said menu.

3. The method of claim 1, wherein said step of selecting one of said items includes a step of highlighting an item in response to producing directional-data in a direction towards said selected item.

4. The method of claim 1, wherein said generating step includes the steps of:
    processing said positional data to distinguish a first contact location from a second contact location;
    displaying a first menu in response to identifying said first contact location; and
    displaying a second menu in response to identifying said second contact location.

5. The method of claim 1, wherein said generating step includes the step of presenting a cursor.

6. The method of claim 5, wherein said producing step also includes a step of moving said cursor.

7. The method of claim 5, wherein said producing step also includes a step of moving a background image relative to said cursor.

8. The method of claim 6, wherein the speed of a said movement increases in response to an increase in said intensity-data.

9. An apparatus, comprising a manually-interactive-device, a display-device and a processor, wherein:
    said manually-interactive-device has a resolution sufficiently high to produce a plurality of data-points in response to an interaction with a single finger, consisting of initial positional-data and initial intensity-data;
    said display-device shows a menu of selectable items in response to initial positional-data and initial intensity-data;
    said processor is configured to produce directional data, in response to said manually-interactive-device generating additional intensity-data at said data points during a rolling or tilting of an applied finger, said processor configured to determine said directional data by comparing the differences between said initial positional-data and initial intensity-data and said additional intensity-data; and said processor is further configured to distinguish between a first-intensity and a second-intensity of said initial intensity-data, wherein said second-intensity is higher than said first intensity, only showing said menu upon detecting said second-intensity; and to select one of said selectable items in response to said rolling or tilting of an applied finger.

10. The apparatus of claim 9, wherein said manually-interactive-device is combined with said display screen to form a touch-screen.

11. The apparatus of claim 9, wherein:
said manually-interactive device includes a plurality of sensors arranged in a matrix; and
said processor is configured to sequentially scan said matrix of sensors to obtain said plurality of data points.

12. The apparatus of claim 11, wherein:
said sensors include a variable-resistance material; and
the electrical resistance of said variable-resistance material reduces in response to applied pressure.

13. The apparatus of claim 9, wherein said display-device, in response to said initial positional-data and initial intensity-data, shows a modified image indicating that a particular function has been selected, and said modified image is modified by an extent that varies in response to a degree of applied pressure.

14. A mobile system, comprising a touch-screen, a processor and an input device for receiving geographical data, wherein:
said touch-screen generates initial positional-data and initial intensity-data from an initial contact of a finger upon said manually-interactive-device, in which said manually-interactive-device has a resolution sufficiently high to produce a plurality of data-points in response to the application of a single finger;

said touch-screen shows a cursor overlaying a geographical image derived from said geographical data;

said processor produces directional-data in response to a finger rolling or tilting operation, by generating additional intensity-data in which variations occur to intensity values at said plurality of data points, and compares the differences between said initial positional-data and initial intensity-data and said additional intensity-data;

said geographical data is scrolled in a direction determined by said directional-data;

said generation of said initial positional-data and said initial intensity-data presents a menu of selectable items on a display screen; and said production of said directional-data selects one of said items in response to said finger rolling or tilting operation; wherein said processor is configured to:

process said initial intensity-data to distinguish between a first-intensity and a second-intensity, wherein said second-intensity is higher than said first intensity; and show said cursor upon detecting said second-intensity.

15. The system of claim 14, wherein the speed of a said movement increases in response to an increase in said intensity-data.

16. The system of claim 14, assembled as a hand-held portable device, wherein said input device receives geographical data from a remote data source.

17. The system of claim 14, assembled within a vehicle as a satellite navigation system, wherein said input device receives geographical data from a local data storage device.

* * * * *